United States Patent [19]
Nelson et al.

[11] Patent Number: 5,528,934
[45] Date of Patent: Jun. 25, 1996

[54] WATERPROOF AND FOG RESISTANT GAUGE

[75] Inventors: Steve D. Nelson, Bradenton; James Champion, Sarasota; Jack Sossamon, Bradenton, all of Fla.

[73] Assignee: T Eleflex, Inc., Plymouth Meeting, Pa.

[21] Appl. No.: 480,509

[22] Filed: Jun. 7, 1995

Related U.S. Application Data

[63] Continuation of Ser. No. 273,701, Jul. 12, 1994, abandoned.

[51] Int. Cl.⁶ .................................................. G01D 11/24
[52] U.S. Cl. ........................................................ 73/431
[58] Field of Search ........................... 73/431, 325, 706; 116/305; 374/208; 324/156; 340/693

[56] References Cited

U.S. PATENT DOCUMENTS

| | | |
|---|---|---|
| 1,925,999 | 9/1933 | De Giers . |
| 2,476,909 | 7/1949 | Ratz ......................... 324/156 |
| 2,701,969 | 2/1955 | Meredith ................... 324/156 |
| 3,530,723 | 9/1970 | Hogue et al. ............... 73/431 |
| 4,628,731 | 12/1986 | Copeland . |

Primary Examiner—Robert Raevis
Attorney, Agent, or Firm—Howard & Howard

[57] ABSTRACT

A waterproof and fog resistant gauge (10) includes a housing (12) forming a chamber (14) with a base (18) and opposing open end (16). The open-end (16) is enclosed by a bezel (60) compressing a pair of lenses (50, 52) spaced by a gasket (46) against and to the housing (12). The spaced lenses (50, 52) provides a "dead air" space between the lenses (50, 52) preventing air from entering or exiting. The housing (12) also includes an aperture (70) covered by an anaerobic filter (72) which allows the chamber (14) to breath while preventing water and other contaminants from entering the gauge (10).

8 Claims, 2 Drawing Sheets

WATERPROOF AND FOG RESISTANT GAUGE

This application is a continuation of Ser. No. 273,701, filed Jul. 12, 1994, now abandoned.

TECHNICAL FIELD

The invention relates to a gauge for displaying a measured value, such as temperature, oil pressure, fuel, and the like, which gauge is waterproof and fog resistant.

BACKGROUND OF THE INVENTION

Gauges for displaying measured values are utilized in a variety of environments such as land vehicles, airplanes, and also watercrafts. Such gauges are commonly used to display fuel level, oil pressure, temperature, etc. In many of the environments, atmospheric conditions exist which may cause the production of fog on the lens of the gauge, especially when the lens becomes cooler than the interior of the gauge and moisture within the gauge deposits on the lens. This fogging is undesirable as it hampers viewing of the gauge display.

U.S. Pat. No. 4,628,731 issued Dec. 16, 1986 in the name Copeland discloses a fog resistant gauge which utilizes two spaced lenses with a surrounding baffle. The baffle "restricts" air flow into and out of the space between the lenses, although some air is allowed to pass therebetween. Both of the lenses are coated with a clear, anti-fog coating. The gauge includes an outer housing or casing which is secured to the baffle adjacent the lenses. Within the outer casing is included an inner casing which includes a vent slot therethrough so that the interior of the inner casing is in communication with the interior of the outer casing so that heat dissipated by the inner casing is in air exchange through the vent. Problems with this type of design is that fogging still exists and the anti-fog coatings disintegrate over time. Furthermore, the lenses are plastic which eventually can pass water therethrough.

None of the prior art gauges have been tested and found suitable for anti-fog and waterproof capability, nor have any satisfied cost and manufacturing considerations.

SUMMARY OF THE INVENTION

The invention relates to a gauge assembly which comprises a housing forming an internal chamber and having an open end. An indicator is secured with the housing at the open end within the chamber. A first lens is secured adjacent the open end to close the chamber. A bezel is connected adjacent the open end securing the lens to the housing. The assembly is characterized by including a second lens spaced from the first lens secured to the housing by the bezel and a seal gasket between the first and second lenses preventing air from passing between the lenses.

The invention also is characterized by the housing including an aperture opposing the open end and an anaerobic filter secured over the aperture to prevent water from passing into the chamber and in allow air to pass into and out of the chamber.

The advantages of the invention result from the area between the lenses being sealed to create a "dead air" space between the lenses. As temperature inside and outside the gain change, this "dead air" space maintains a slow transfer of temperature between the outer ambient and inner areas of the gauge thus reducing the chance of fogging considerable. Furthermore, the filter allows air to pass into the chamber but not water which provides a gauge that breathes instead of a gauge that is sealed as known in the art. This allows better transfer of air from the inside of the gauge to the outside, but still stops the penetration of the gauge by liquid, dust, etc.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
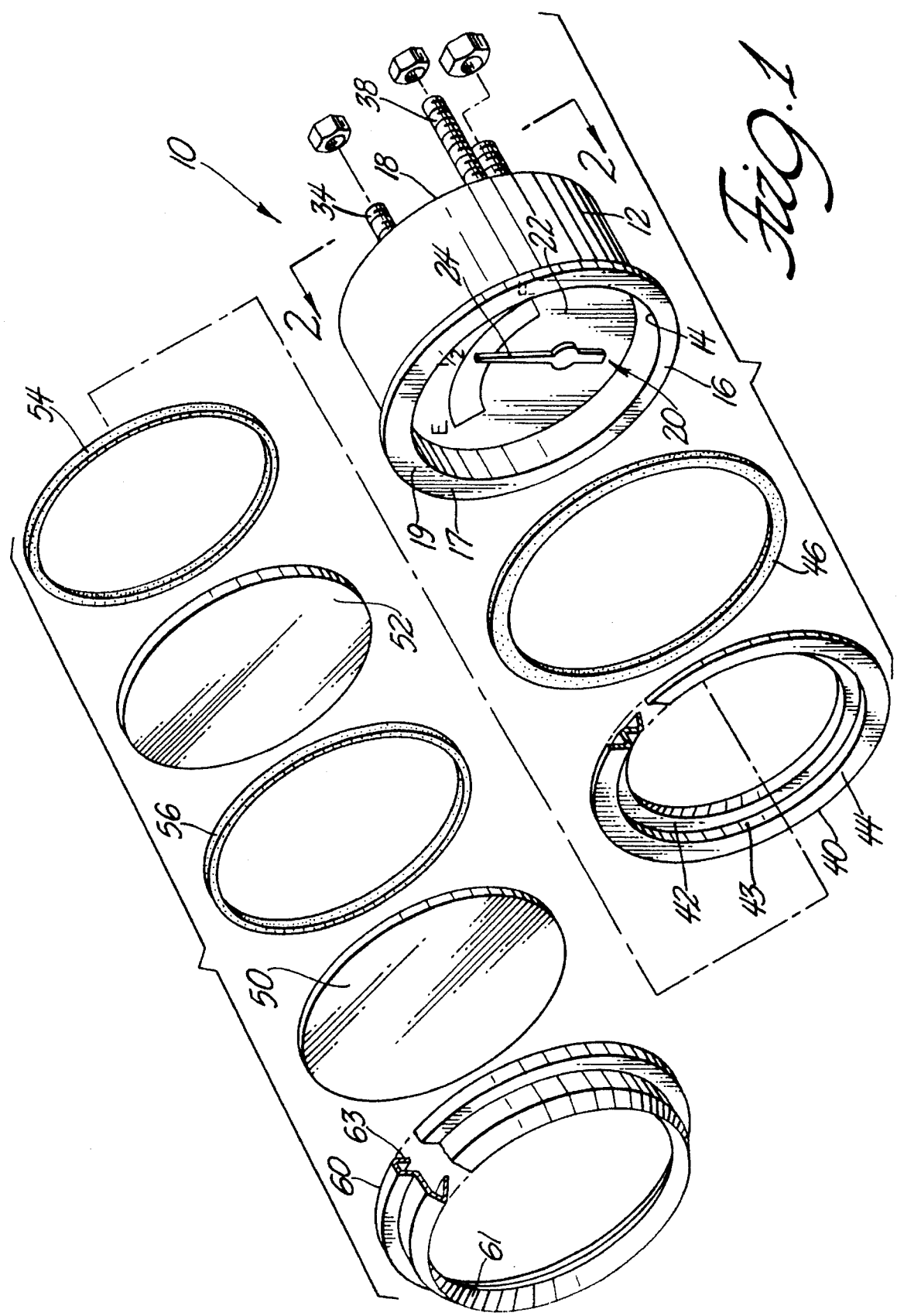
FIG. 1 is a partially expanded, perspective view of the subject invention.
Figure 2:
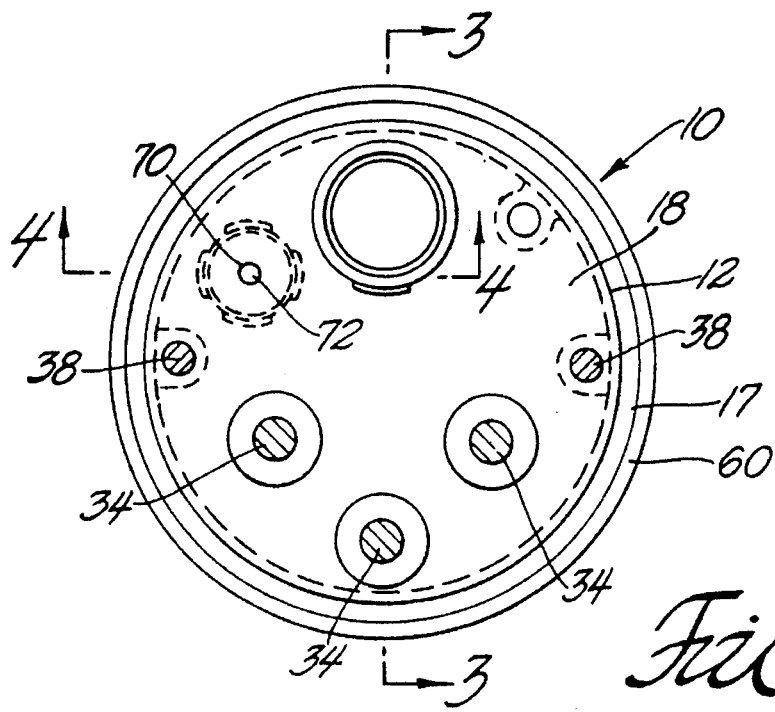
FIG. 2 is a partial cross sectional rear view taken along lines 2—2 of FIG. 1.

A fog resistant gauge assembly 10 is generally illustrated in FIG. 1. The gauge assembly 10 allows for the display and registering of measured parameters of a vehicle, such as fuel level, oil pressure, etc. The gauge assembly 10 is of particular importance in applications having fogging tendencies, such as watercraft. However, it is to be understood that the gauge assembly 10 may be utilized in any type of applications where gauges are utilized.

The gauge assembly 10 includes a housing 12 forming an internal chamber 14. The housing 12 is generally cup-shaped and cylindrical having an open end 16. The open end 16 includes a flange 17 extending radially outwardly from the housing 12 to provide a flat sealing surface 19. The housing 12 includes a closed end or backside 18 forming the base of the cup-shape which opposes the open end 16. The housing 12 is generally of molded plastic, non-conductive material.

An indicator 20 is secured with the housing 12 at the open end 16 within the chamber 14 and facing outwardly. The indicator 20 generally comprises a dial face 22 of generally disc shape including any measured value or reference numerals thereon which face outwardly through the open end 16. The dial face 22 is slightly smaller than the diameter of the housing 12. The indicator 20 also includes a pointer 24 connected between the dial face 22 and the open end 16. The pointer 24 is controlled to indicate the measured value by pivoting about the dial face 22, and typically known in the art.

Figure 3:
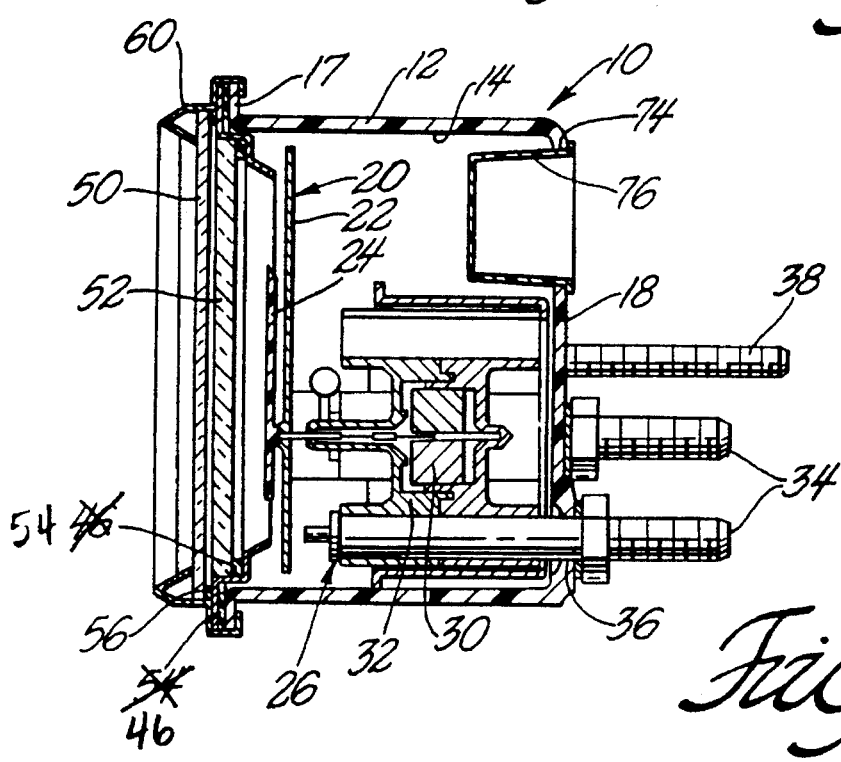
FIG. 3 is a cross sectional side view taken along line 3—3 of FIG. 2.
Figure 4:
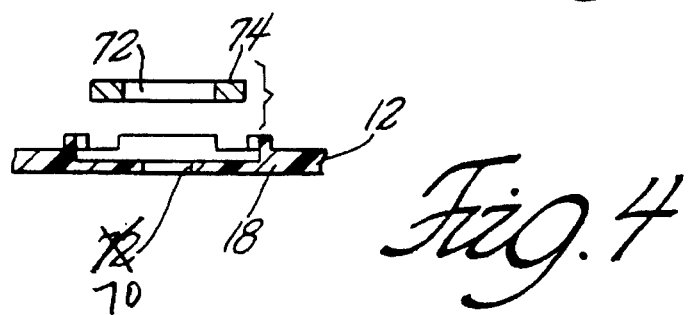
FIG. 4 is an expanded cross-sectional view of the filter taken along lines 4—4 of FIG. 2.

Also included is an electronic driver 26 (FIG. 3) connected to the indicator 20 to indicate the measured value. The driver 26 generally comprises a bobbin/can assembly, as commonly known in the art. The bobbin 30 generally comprises an inductive coil which, depending on its charge, pivots the pointer 24. The can 32 of the assembly 28 supports the bobbin 28 and provides the conductive communication from electrical studs 34 for charging the bobbin 30. The can 32 receives three electrical studs 34. The electrical studs 34 extend from in the chamber 14 to outside of the housing 24 through apertures 36 formed in the housing 12.

The housing 12 also includes mounting studs 38 extending through the backside 18 and fixedly molded to the housing 12 to allow for mounting for the gauge assembly 10 within a vehicle.

The assembly 10 includes a retainer ring 40 placed adjacent the open end 16 of the housing 12 on the flange 17. The retaining ring 40 includes an inner diameter radial surface 42 radially and axially offset from an outer diameter radial surface 44. The outer diameter radial surface 44 is placed flat against the flange 17. The inner diameter radial surface 42 is offset by a shoulder 43 from the outer diameter radial surface 44 and extends into the chamber 14.

The assembly 10 includes an outer sealing gasket 46 which is placed between the retaining ring 40 and the flange 17 for sealing same preventing air or moisture to pass therebetween. The gasket 46 may be comprised of a rubber ring or other suitable seal component.

The assembly 10 includes a first lens 50 secured adjacent the open end 16 to close the chamber 14. The first lens 50 is approximately the same diameter as the diameter of the flange 17. Also included is a second lens 52 spaced from the first lens 50 and of a smaller diameter, and slightly less than the diameter of the interior of the housing 12 and chamber 14. The first lens 50 is spaced outwardly from the second lens 52, with the second lens 52 located at the end of the chamber 14. The second lens 52 is placed adjacent and inwardly of the shoulder 43 of the retainer ring 40 and flat against the inner diameter surface 42. Both lenses 50, 52 are preferably made of glass. As illustrated in the drawings, the lens 50, 52 are flat. However, it should be understood that the lens 50, 52 may be convex domed glass lenses, curved outwardly from the chamber 14 at the center thereof.

An inner sealing gasket 54 is placed between the inner diameter radial surface 42 of the retainer ring 40 and the second lens 52, flat against the inner diameter radial surface 42. A spacing sealing gasket 56 is secured against the outer diameter radial surface 44 and against the first lens 50. This spacing/sealing gasket 56 provides and maintains the space between the first and second lenses 50, 52 in sealing configuration. The spacing gasket 56 is in compression between the lenses 50, 52 which provides a seal of the air therebetween, e.g., "dead air" space.

The assembly 10 includes a bezel 60 connected adjacent the open end 16 outside the outer lens 50 for securing the first lens 50 to the housing 12 in assembly. The bezel 60 includes an overlap flange 61 for overlapping the edges of the outer lens 50 and pressing against its outer face. The bezel 60 also includes a crimping flange 63 for securely crimping about the housing flange 17. The bezel 60 is compressed against the first lens 50 and housing 12, and crimped against the flange 17 for complete securement and assembly of the gaskets 46, 54, 56 and retainer ring 40 and lenses 50, 52 with the housing 12. With the gaskets 46, 54, 56 in compression by the bezel 60 during assembly, and subsequent crimping of the bezel 60 about the flange 17, the gasket 56 between the lenses 50, 52 is maintained compressed for the life of the product. This creates the "dead air" space between the lenses 50, 52. As temperature inside and outside the gauge 10 changes, this "dead air" space maintains a slow transfer of temperature between the outer ambient and inner areas of the gauge 10 thus reducing the chance of fogging considerably. The remaining gaskets 46, 54 prevent moisture, water and air from entering the gauge 10 through the bezel connection.

The housing 12 includes an enlarged opening 74 therein for receiving either a light to provide a back lit gauge, or maybe merely plugged, as illustrated by plug 76, as commonly known in the art.

The housing 12 includes an aperture 70 in the backside 18 to allow the chamber 14 to breath. An anaerobic filter 72 is secured over the aperture 70 to prevent water from passing into the chamber 14, while allowing air to pass into and out of the chamber 14. Such filter 72 may be made of any anaerobic material, i.e., Goretex™. The breathing effect allows the temperature inside of the gauge to more closely match the ambient temperature thus reducing the chance of fogging. The filter 72 is mounted in a foam holder 74 and can be mounted to the housing 12 by sonic welding, adhesive, or other sealing process, to provide a seal.

Therefore, by sealing the area between the two lenses 50, 52, the "dead air" space is created which slows the rate of temperature change from one side of the lens to the other increasing fog resistivity. Non anti-fog coating is necessary. The filter 72 allows the gauge 10 to breath while preventing penetration of the gauge 10 by liquid, dust, etc.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A gauge assembly comprising:

a cup shaped housing (12) having a closed end (18) and an open end (16) defining an internal chamber (14);

an indicator (20) disposed within said chamber (14) of said housing (12) at said open end (16);

said housing (12) including an annular flange (17) extending radially outwardly from said open end (16) of said housing (12);

a first lens (50) overlying said flange (17);

a second lens (52) having a smaller diameter than said first lens (50) and smaller than said housing (12) and supported within said chamber (14) of said housing (12) adjacent said flange (17) and in spaced relationship to said first lens (50);

sealing means for sealing the space between said first (50) and second (52) lenses to prevent air from passing into and out of the space between said lenses (50, 52);

a retainer (40) presenting a shoulder (43) surrounding said second lens (52) and an inner radial surface (42) for axially positioning said second lens (52);

said retainer (40) including an outer radial surface (44) overlying said flange (17) of said housing (12); and a bezel (60) overlapping said flange (17) of said housing and sandwiching said first lens (50) and said outer surface (44) of said retainer against said flange (17) of said housing (12).

2. An assembly as set forth in claim 1 wherein said sealing means includes a first gasket (56) compressed between said first lens (50) and said outer surface (44) of said retainer (40).

3. An assembly as set forth in claim 2 wherein said sealing means includes a second gasket (54) disposed between said radial surface (42) of said retainer (40) and said second lens (52).

4. An assembly as set forth in claim 3 wherein said sealing means includes a third gasket (46) compressed between said outer surface (44) of said retainer (40) and said flange (17) of said housing (12).

5. An assembly as set forth in claim 4 wherein said first (50) and second (52) lens comprise glass.

6. An assembly as set forth in claim 5 further characterized by said housing (12) including an aperture (70) therein opposing said open end (16) to allow air to pass therethrough.

7. An assembly as set forth in claim 6 further characterized by including an anaerobic filter (72) secured over said aperture (70) preventing water from passing into said chamber (14) while allowing air to pass therethrough.

8. An assembly as set forth in claim 7 further characterized by including an electronic driver (26) secured within said chamber (14) and connected to said indicator (20) to control said indicator (20) to indicate a measured value, said driver (26) including a terminal extending outside of said housing (12).

* * * * *